3,023,095
DEFOLIANTS

John H. Nolan, St. Louis, Mo., assignor to Monsanto Chemical Company, St. Louis, Mo., a corporation of Delaware
No Drawing. Filed July 11, 1956, Ser. No. 597,075
8 Claims. (Cl. 71—2.2)

This invention relates to improvements in the method of defoliating deciduous plants, and more particularly to compositions which provide an effective premature dropping of leaves by growing plants.

It is well known that certain chemical compounds have the ability to defoliate plants. Although many compounds are sold for this purpose and are used to remove leaves which interfere with the harvesting of certain crops, particularly cotton and beans, they do not always provide a completely satisfactory result. Accordingly, the need for more effective defoliating agents is present and such a compound would provide a substantial improvement in the agricultural art.

The principal purpose of this invention is to provide a novel method for prematurely removing leaves from plants. A further purpose of this invention is to provide compositions, which will defoliate plants more effectively than compounds heretofore available. Further purposes of this invention will be evident from the following description of the invention.

The theory of defoliation is well known. Deciduous perennial plants have at the base of their leaves a layer of cells known as abscission cells, which in the normal metabolic process become enlarged and weakly bonded, whereby a fission between cell layers results enabling the leaf to become severed from the plant. This procedure may take place normally at the end of the growing season, when the plant is becoming dormant, or it may take place in exceedingly dry weather where sufficient moisture is not available to enable the proper function of the entire leaf area of the plant. The artificial defoliation of plants is effected by applying compounds to the leaves which either directly or indirectly induce the normal growth of the abscission cells. The defoliation of plants is not a herbicidal action, and the dropping of the leaves, even where 100 percent defoliation is effected does not destroy the plant, the fruit continuing to grow and ripen after the defoliation has taken place.

The need for or desirability of defoliation with respect to certain crops is well recognized. The laborious hand-picking of the bolls represents a substantial cost in the production of cotton. Although many machines have been constructed for picking cotton, the desired result is often not satisfactory because of interference by the leaves. The machines for picking cotton will often remove leaves and the crushing of the leaves in the normal operation of the machine will frequently stain cotton so as to down-grade the product, or at least require a hand-sorting operation to remove leaves and to separate the stained cotton bolls. Because of the access to the sun, the cotton is completely dry and will enable a more efficient operation of the cotton machines.

The defoliation is also useful in the harvesting of beans. Through the use of defoliants soy beans and other beans conventionally harvested in dry form may be machine picked to recover a high yield of simultaneously ripened seeds without the usual interference of leaves. Other crops which use presently available defoliants may be effectively treated by the novel method herein described.

It has been discovered that certain types of iodine salts are useful in prematurely defoliating plants. Useful compounds are the iodides and iodates, including the alkaline metal salts, sodium iodide, potassium iodide, sodium iodate, potassium iodate and the corresponding alkaline earth metal salts, particularly calcium iodide and calcium iodate, the ammonium salts, ammonium iodide and ammonium iodate, the magnesium iodide and iodate, and any other metal salts which are soluble in water to an extent required for defoliant formulations.

In the practice of this invention water solutions of the inorganic iodine salts are prepared and sprayed on the plant which is to be defoliated. It has been found that the quantity applied to the plant may vary to some extent being dependent upon the leaf area and the wettability of the leaf surface. In general this will be approximately 0.1 to 20 pounds per acre, and preferably from 0.5 to 5 pounds per acre. Useful solutions and formulations are those which contain from 0.05 to 5 percent of the active ingredient, but greater concentrations or more dilute concentrations may be used depending upon the ability of the foliage to retain the formulation. It will be apparent that the concentrations which give the optimum result at lowest minimum cost are those which reach the drip point when the amount deposited on the leaf is the known quantity required to produce 100% defoliation or the desired extent of defoliation. Obviously this will depend upon the wettability of the leaf and the ability of the leaf surface to retain the maximum quantity prior to the drip point.

In some cases the physical nature of the leaf surface is such as to make liquid spray operations unfeasible. In such cases dry pulverulent formulations may be used. This type of application generally requires formulation with suitable pulverulent materials which include the natural clays, such as china clays, the bentonites and the attapulgites; other minerals in natural state, such as talc, pyrophyllite, quartz, diatomaceous earth, fuller's earth, chalk, rock phosphate and sulfur; and the chemically modified minerals, such as the acid washed bentonite, precipitated calcium phosphate, precipitated calcium carbonate and colloidal silica. These diluents may represent a substantial portion, for example 50 to 90 percent by weight of the formulation applied to the plant. Here again the precise proportion to be used will depend upon the quantity of active component which will be retained on the leaf surface so as to provide an amount which will produce the optimum result. It has been found that the formulation must be such as to leave in contact with the leaf surface the quantity of active defoliant ingredient required to produce 100 percent defoliation or the extent of defoliation required or desired.

It has also been found that defoliant formulations may include other aids or conditioning agents for producing maximum efficiency. These include wetting or dispersing agents, agents for adhering the active component to the leaf surfaces and aids for changing the physical characteristics of the leaf structure.

The conditioning agents which produce a wetting or dispersing agent may be used in both solid or liquid formulations. These include conventional soaps, such as the water-soluble salts of long chain carboxylic acids, the amino soaps such as the amine salts of long chain carboxylic acids, the sulfonated animal, vegetable and mineral oils, quaternary salts of high molecular weight acids, rosin soaps such as salts of abietic acid, sulfuric acid salts of high molecular weight organic compounds, algin soaps, ethylene oxide condensated with fatty acids, alkyl phenols and mercaptans, and other simple and polymeric compositions having both hydrophilic and hydrophobic functions so as to enable the mixing of otherwise immiscible ingredients. Generally, the surface active agents will be only a minor portion of the formulation as used, for example less than 10 percent and frequently as low as 0.05 percent. In general, concentrations of from 0.5 to 5 percent ore found to be optimum.

Many of the formulations are benefited by the incorporation of organic solvents for the active components, such as the water-immiscible organic alcohols, ketones and hydrocarbons, for example isopropanol, benzene, acetone, methylethyl ketone, kerosene, and chlorinated hydrocarbons. The proportions of such organic liquid additives will depend upon the solubility properties of the active ingredient and may require as little as 1 percent or as much as 20 percent in order to provide a uniformly distributed formulation which is capable of maintaining its distributed state during storage, use and after application to the soil or plant surfaces.

Either the solid or the liquid formulations may include small quantities of nautral or artificial polymers which may become viscous with the evaporation of the formulation of the vehicle or which in the case of solid compositions may become viscous liquids by hygroscopic action or by partial solution in water subsequently sprayed on the surface or by natural rainfall. Suitable agents of this type are the natural gums, for example gum arabic, gum tragacanth or gum acacia or they may be synthetic polymers such as carboxymethyl cellulose, alginic acid or salts, polyvinyl alcohol or the wholly synthetic polymers such as hydrolyzed polyacrylonitrile, any polymers of vinyl acetate and maleic anhydride or any of the other well known polymeric polyelectrolytes.

The solid formulations may be applied in the form of dust or they may be dispersed in a liquid vehicle, for example water in which they may be completely soluble or partially soluble but dispersed through the action of surface active components of the formulation. In many cases the water soluble components may have their solubility inhibited by the presence of known solvents in which case the aqueous formulation may exist as an emulsion, either soil in water or water in soil depending upon the quantity of hydrophilic or hydrophobic liquid vehicle present. In general the nature of formulation is believed to be within the province of one skilled in the art.

Further details of the practice of this invention are set forth with respect to the following specific examples.

*Example 1*

A defoliant formulation was prepared using one part by weight of potassium iodide, 98 parts of water and one part of an emulsifier consisting of 65 percent of a condensate of ethylene oxide and tall oil acids and 35 percent of butylamine dodecylbenzene sulfonate. Using this formulation bean plants were sprayed and the extent of defoliation observed as follows.

Pounds per acre:      Defoliation, percent
  18 _____ 100
  6 _____ 100
  1.8 _____ 80–90
  .9 _____ 90
  .18 _____ 25

*Example 2*

A defoliation formulation was prepared using 98 parts by weight of water, one part of potassium iodate and one part of an emulsification agent consisting of 35 percent by weight of butylamine dodecylbenzene sulfonate and 65 percent of a condensate of ethylene oxide and tall oil acids. Bean plants were sprayed at various levels of application and the defoliation observed as follows.

Pounds per acre:      Defoliation, percent
  18 _____ 100
  9 _____ 100
  1.8 _____ 60
  .9 _____ 50

*Example 3*

A defoliant composition was prepared by adding 5% of propylene glycol to the potassium iodide formulation described in Example 1. At both 1.8 pounds per acre and at 0.9 pound per acre 100 percent defoliation was obtained. A separate control experiment with 10% propylene glycol in water produced from 0–5 percent defoliation.

*Example 4*

The addition of 0.5 percent of a sulfur containing compound to the formulation of Example 1 was found to enhance the activity of potassium iodide.

| Sulfur-Iodide Formulation | Pounds per Acre | Defoliation, percent |
|---|---|---|
| Wettable sulfur formulation | 1.8<br>.9 | 100<br>100 |
| Vinylmercapto benzothiazol formulation | 1.8<br>.9 | 100<br>100 |
| Na$_2$SO$_3$ formulation | 1.8<br>.9<br>.18 | 100<br>100<br>90 |
| NaHSO$_3$ formulation | 1.8<br>.9<br>.18<br>.09 | 100<br>100<br>40<br>40 |
| (NH$_4$)$_2$SO$_4$ formulation | 1.8<br>.9<br>.18 | 100<br>100<br>50 |

*Example 5*

Potassium iodate formulated as in Example 2 was mixed with 0.5 percent wettable sulfur. The following defoliation was obtained at various concentrations.

Pounds per acre:      Defoliation percent
  1.8 _____ 100
  .9 _____ 100
  .18 _____ 90

The invention is set forth in the followings claims.
What is claimed is:

1. The method of defoliating crop bearing plants which comprises applying to the leaves of said plant an aqueous mixture of elemental sulfur and a water-soluble compound of the group consisting of the salts of iodic acid and the salts of hydroiodic acid, said mixture being applied in an amount sufficient to induce defoliation.

2. The method defined by claim 1 wherein the salt is an alkali metal iodate.

3. The method defined by claim 1 wherein the salt is potassium iodate.

4. The method defined by claim 1 wherein the salt is sodium iodate.

5. The method of defoliating crop bearing plants which comprises applying to the leaves of said plant an aqueous mixture of elemental sulfur and an alkali metal iodide, said mixture being applied in an amount sufficient to induce defoliation.

6. The method of defoliating crop bearing plants which comprises applying to the leaves of said plant an aqueous mixture of elemental sulfur and a sodium iodide, said mixture being applied in an amount sufficient to induce defoliation.

7. The method of defoliating crop bearing plants which comprises applying to the leaves of said plant an aqueous mixture of a water-soluble salt of iodic acid and elemental sulfur, said solution being applied in an amount sufficient to induce defoliation.

8. The method of defoliating crop bearing plants which comprises applying to the leaves of said plant an aqueous mixture of a water-soluble salt of hydroiodic acid and elemental sulfur, said mixture being applied in an amount sufficient to induce defoliation.

References Cited in the file of this patent
UNITED STATES PATENTS

| | | |
|---|---|---|
| 2,079,827 | Volck | May 11, 1937 |
| 2,368,275 | Torley | Jan. 30, 1945 |
| 2,368,601 | Torley | Jan. 30, 1945 |

(Other references on following page)

UNITED STATES PATENTS

| | | |
|---|---|---|
| 2,658,826 | Clarke et al. | Nov. 10, 1953 |
| 2,726,149 | Boyd | Dec. 6, 1955 |

FOREIGN PATENTS

| | | |
|---|---|---|
| 492,596 | Great Britain | Sept. 19, 1938 |

OTHER REFERENCES

Mellor: "Comprehensive Treatise on Inorganic and Theoretical Chemistry," 1928, vol. 28, pages 637, 640.

Aberg, in "Chemical Abstracts," vol. 42, 6416(g) to 6417(a), 1948.

Thorpe's Dictionary of Applied Chemistry, 1921, vol. 7, pages 455 and 456.

Godnev et al., in "Chemical Abstracts," vol. 45, 797(a), 1951.

Lorenzo-Andrew in "Chemical Abstracts," vol. 46, 8721(c), 1952.